(12) United States Patent
Carlen et al.

(10) Patent No.: US 6,754,065 B2
(45) Date of Patent: Jun. 22, 2004

(54) FILM CAPACITOR AND FILM FOR A FILM CAPACITOR

(75) Inventors: Martin Carlen, Niederrohrdorf (CH); Christian Ohler, Baden (CH)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 10/267,695

(22) Filed: Oct. 10, 2002

(65) Prior Publication Data

US 2003/0076647 A1 Apr. 24, 2003

(30) Foreign Application Priority Data

Oct. 23, 2001 (EP) .............................................. 01811033

(51) Int. Cl.[7] ......................... H01G 4/005; H01G 4/015
(52) U.S. Cl. ...................................... 361/303; 361/273
(58) Field of Search ........................ 361/273, 303–305, 361/301.2, 301.4, 301.5, 311–313, 323

(56) References Cited

U.S. PATENT DOCUMENTS

| 4,482,931 A | * | 11/1984 | Yializis | ...................... 361/273 |
| 5,453,906 A | * | 9/1995 | Doll | .......................... 361/273 |
| 5,757,607 A | | 5/1998 | Folli | |

FOREIGN PATENT DOCUMENTS

| DE | 19856457 | 6/2000 |
| EP | 0813213 | 12/1997 |
| GB | 2276765 | 10/1994 |
| WO | WO99/45552 | 9/1999 |

* cited by examiner

*Primary Examiner*—Dean A. Reichard
*Assistant Examiner*—Eric Thomas
(74) *Attorney, Agent, or Firm*—Burns, Doane, Swecker & Mathis, L.L.P.

(57) ABSTRACT

The capacitor according to the invention is wound from at least one film (1) comprising a carrier film (3)—serving as dielectric—with at least one conductor layer (4). It has an internal series circuit. The latter is brought about by the conductor layer (4) applied on the dielectric or the conductor layers being divided into sectors (4.1, 4.2) which are mutually arranged and, if appropriate, connected to one another in such a way that a plurality of series-connected elementary capacitors are formed. It is distinguished essentially by the fact that a current path structure is formed on the sectors, the conductor layer (4) having a high sheet resistance for the purpose of reducing breakdown-governed capacitance losses and the current paths (5, 6) of the current path structure having a significantly reduced sheet resistance for the purpose of reducing the total sheet resistance.

13 Claims, 2 Drawing Sheets

FILM CAPACITOR AND FILM FOR A FILM CAPACITOR

This application claims priority under 35 U.S.C. §§ 119 and/or 365 to Appln. No. 01811033,8 filed in Europe on Oct. 23, 2001; the entire content of which is hereby incorporated by reference.

FIELD OF THE INVENTION

The invention relates to a film capacitor and a film for a film capacitor. The film capacitor is constructed from at least one carrier film with at least one conductor layer, the at least one conductor layer being divided into sectors and the sectors being mutually arranged in such a way that the film capacitor has an internal series circuit of elementary capacitors.

BACKGROUND OF THE INVENTION

Film capacitors exist for a wide capacitance range. In general, the dielectric in such film capacitors comprises a plastic film. The electrodes comprise conductive metal areas. These metal areas are either thin conductor films or conductor layers vapor-deposited onto the plastic film. If the conductor layers are thin enough—they are often Al or Zn alloys applied in a vacuum with a thickness in the range of 10–20 nm—, there is a self-healing effect in the event of electrical breakdowns, i.e. the metal layer evaporates in the vicinity of the breakdown location. In the event of an electrical breakdown, the metal layer evaporates in the vicinity of the discharge or at a point provided for this in proximity thereto. After a breakdown, the capacitor can still be used, although with a slightly reduced capacitance.

The prior art discloses films for film capacitors which have segmented metallizations. The individual segments of the metal coating have a low sheet resistance and are isolated from one another by trench-like cutouts. The segments are connected by conductor bridges with a small cross section. These conductor bridges serve as protection devices which, in the event of an electrical breakdown, isolate the affected segment from the remaining segments. If a local breakdown occurs, the power liberated at the breakdown location is limited by the protection devices, as a result of which relatively great damage can be avoided.

DE-A 198 56 457 describes a film having conductor layers with a current path structure formed thereon. The conductor layers themselves have a high sheet resistance for the purpose of reducing breakdown-governed capacitance losses. The current paths run in the conductor layer and have a lower resistance than the conductor layer for the purpose of reducing the total sheet resistance. The current path structure has a main current path in the film direction and auxiliary current paths branching therefrom.

GB 2 276 765 discloses multilayers of capacitor films for internal series circuits. The electrodes exhibit segmentation and have zones with high electrical resistance, where the capacitance is produced, and zones with low electrical resistance at the locations of the connecting areas.

U.S. Pat. No. 5,757,607 shows unsegmented multilayer electrodes with an internal series circuit and a profile in the metallization.

Existing electrodes for high-voltage capacitors with an internal series circuit require a relatively high conductivity and conductor bridges between the segments or profiled electrodes. Such a capacitor design has disadvantages with regard to the self-healing properties. Owing to the high electrode conductivity, during the self-healing process a relatively high energy is liberated and a relatively large area is made unusable. If, however, on the other hand, the electrode conductivity is reduced, this results in a rise in the losses.

In the case of solutions with segments which are connected by conductor bridges—protection devices—, an additional problem results in combination with the internal series circuit. After burning through the protection device, individual segments can be completely disconnected and no longer have a defined electrical potential. This can lead to undesirable charging effects. Therefore, segmented electrodes have sooner not been taken into consideration heretofore for high-voltage capacitors. Thus, there is an unchanged high demand for a self-healing capacitor with an internal series circuit.

SUMMARY OF THE INVENTION

Thus, it is an object of the invention to provide a capacitor for high voltages which overcomes disadvantages of existing capacitors and which, in particular, is self-healing in the event of a breakdown without an excessively high energy being liberated in the process. Moreover, the capacitor is also intended to operate in low-loss fashion in alternating-current applications.

An exemplary embodiment of a capacitor according to the invention has at least one carrier film as a dielectric and has an internal series circuit. The latter is brought about by the conductor layer applied on the dielectric or the conductor layers being divided into sectors which are mutually arranged and, if appropriate, connected to one another in such a way that a plurality of series-connected elementary capacitors are formed. It is distinguished essentially by the fact that a current path structure is formed on the sectors, the conductor layer having a high sheet resistance for the purpose of reducing breakdown-governed capacitance losses and the current paths of the current path structure having a significantly reduced sheet resistance for the purpose of reducing the total sheet resistance. The sectors may be formed in such a way as to produce an internal series circuit of two, three, four, five, six or more elementary capacitors.

In the event of a breakdown, a conductor layer sheet resistance that is as large as possible limits the region where the conductor layer evaporates. As a result, the capacitance of the capacitor is correspondingly reduced only a little; moreover, less current flows and the energy loss during a breakdown is low. This results in a lengthened capacitor service life. The fact that the total sheet resistance is reduced by current paths with a resistance that is as small as possible means that there is also a reduction of the ohmic losses during a charging or discharging process in normal operation. A capacitor according to the invention with an internal series circuit for high-voltage applications thus makes it possible that, in the event of breakdowns, the capacitance is reduced only a little and, nevertheless, only small losses arising in the form of heat in the capacitor have to be accepted. Moreover, it can manage without conductor bridges serving as protection devices. Therefore, it is also not readily possible for the situation to arise wherein a disconnected segment no longer has a defined potential.

In accordance with one embodiment, the sectors of the conductor layer each have a main current path and auxiliary current paths. The sectors run in strip form, for example, the main current paths then running essentially along the strip longitudinal axes.

For the purpose of additionally reducing capacitance losses in the event of breakdowns, the individual sectors of the capacitor may, for their part, comprise segments that are electrically connected to one another. Auxiliary current paths may run in the individual segments, the segments being interconnected by main current paths. As an alternative to this, however, the segments may also be connected by conductor bridges in a manner known per se.

The surface resistance of the conductor layer is preferably at least 5Ω, particularly preferably at least 20Ω. The sheet resistance of the current paths is significantly lower, preferably by at least a factor of 20 and, for example, by at least a factor of 50. Correspondingly, the current paths may be formed in such a way that they only cover a small part of the area of the conductor layer, for example 10% or less.

The current paths may be formed by local thickened portions of the conductor layer, as a result of which the current path structure has a contour elevated over the electrically conductive structure. As an alternative to this, it is also possible to provide a framework of metal strips made of a different material on the conductor layer. In principle, the conductor layers could even have interruptions at the locations of the current paths, said interruptions being bridged by the metal strips forming the current paths.

The film capacitor is wound, for example. To that end, in accordance with a first example, it is possible to use two carrier films which are coated on one side and whose conductor layer sectors forming the electrodes are arranged offset with respect to one another, thereby automatically producing a series circuit. As an alternative to this, it is also possible to use a carrier film provided with a conductor layer on both sides together with an uncoated carrier film. The sectors of the conductor layers on the two sides of the carrier film are then likewise arranged offset with respect to one another.

BRIEF DESCRIPTION OF THE DRAWINGS

The invention is explained in even more detail below using exemplary embodiments and with reference to highly diagrammatic drawings, in which.

DETAILED DESCRIPTION OF THE INVENTION

Figure 1:
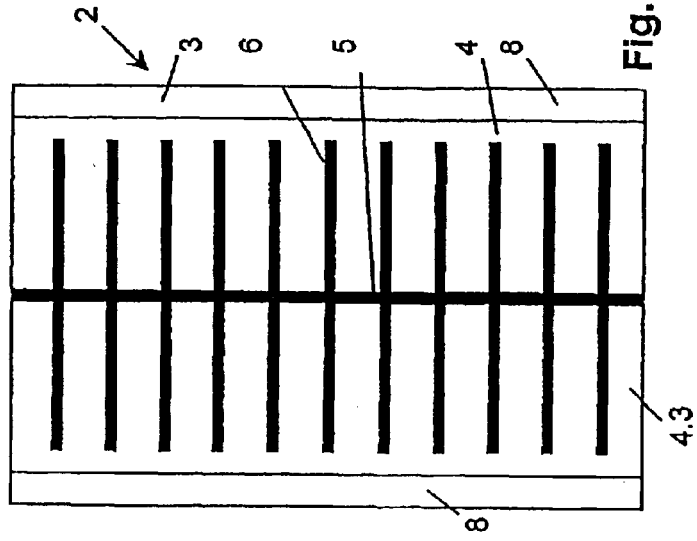
FIGS. 1 and 2 show a plan view—not true to scale—and a perspective view or—likewise not to scale—of a first film of a capacitor according to the invention.
Figure 2:
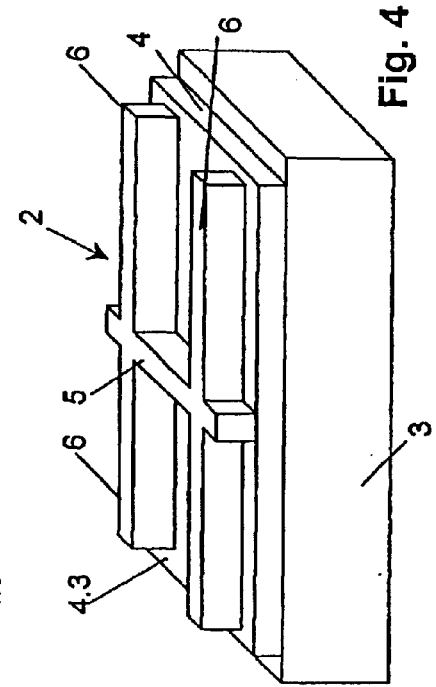

FIGS. 1 and 2 show a first film 1 of a very simple embodiment of a capacitor according to the invention. A carrier film 3 made of a dielectric plastic is provided with a conductor layer 4. The conductor layer is metallic—for example made of Zn or a Zn alloy—or formed from an electrically conductive plastic. The thickness of the carrier film is approximately 2–20 $\mu$m and that of the conductor layer, if it is formed from zinc, is less than 20 nm.

The film is extended in strip form, in each case only a detail from the strip being illustrated in the longitudinal direction in the figures. At both edges of the film, the conductor layer in each case has a local thickened portion which forms a main current path 5. The main current paths 5 of the first film 1 simultaneously serve as edge strengthenings. Auxiliary current paths 6 branch from the main current paths essentially perpendicularly thereto, said auxiliary current paths likewise being formed by local thickened portions of the conductor layer and running into the strip interior. The main 5 and auxiliary current paths 6 are produced, for example, from the same material as the conductor layer 4. If they are composed of Zn, they are 400 nm thick or even thicker. However, they may also be formed from a different material, for example from a metal having an increased conductivity such as Al etc., as a result of which their thickness can also be reduced. In the center of the strip, the conductor layer is interrupted by a gap 7, in which the carrier film 3 is essentially free of a conductive coating. This gap 7 subdivides the conductor layer 4 into two sectors 4.1, 4.2.

The sheet resistance of the conductor layer 4 and/or of the auxiliary current paths 6 may have a profile, for example a gradient, in the transverse direction with respect to the sector longitudinal axes and decrease for example as a function of the distance from the main current path 5. This can be brought about by thickness or width variation or by changing the material composition.

Figure 3:
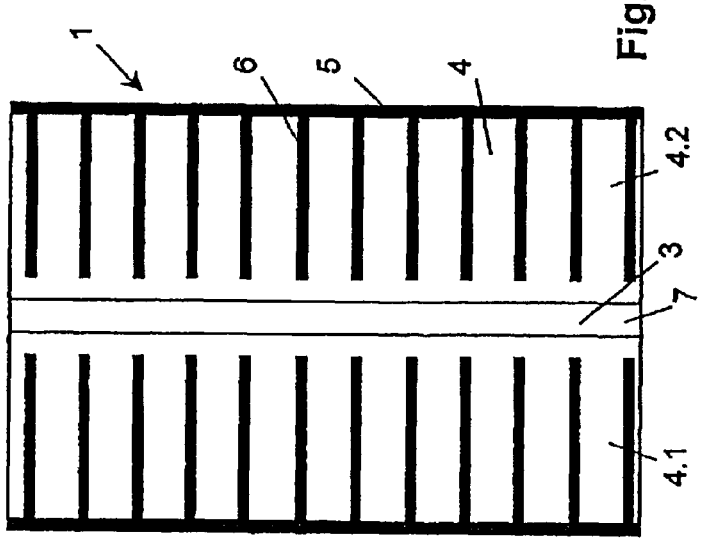
FIGS. 3 and 4 show a plan view and, respectively, perspective view—not true to scale—of a second film of a capacitor according to the invention.
Figure 4:
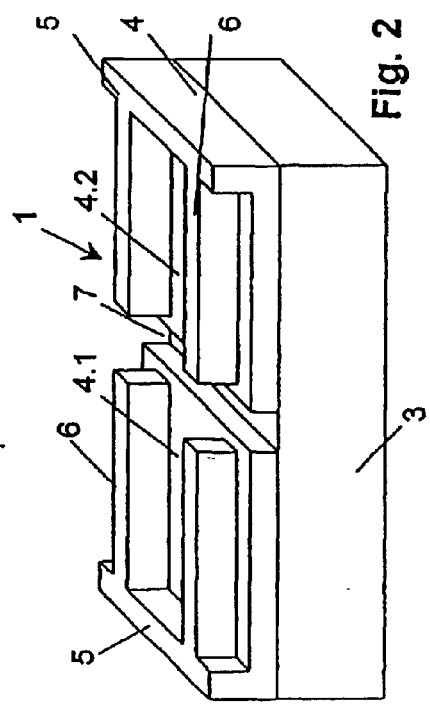

The second film 2 shown in FIGS. 3 and 4 has, for example, essentially the same dimensioning as the first film and is produced from the same materials as the latter. However, its conductor layer 4 has a main current path 5—running in the center—with outwardly projecting auxiliary current paths 6. Free edges 8 run along the longitudinal edges of the carrier film, where the carrier film 3 is free of a conductive coating. The conductor layer 4 is not subdivided, so that it forms a single sector 4.3.

As set forth further below, the sector 4.3 does not have to be contact-connected externally in the operating state of the capacitor. Moreover, on account of the arrangement, in the event of a change in the voltage present on the capacitor, in the sector 4.3 of the second film, primarily currents in the transverse direction flow, i.e. currents in the direction in which the auxiliary current paths 6 run. For these reasons, the main current path 5 can also be omitted on the second film 2 or in the sector 4.3 of the second film.

In the film capacitor, the two films 1,2 are placed one on top of the other and wound in such a way that the capacitor alternately has conductive and insulating layers in cross section. By virtue of the fact that the conductor layer 4 of the first film is subdivided into two sectors 4.1, 4.2, two elementary capacitors are formed when the two films 1, 2 are placed one on top of the other. A first elementary capacitor is formed between the left-hand sector 4.1 of the conductor layer of the first film 1 and the left-hand half of the conductor layer 4 of the second film 2. The second elementary capacitor is formed between the right-hand half of the conductor layer 4 of the second film 2 and the right-hand sector 4.2 of the conductor layer of the first film 1. By virtue of the fact that the conductor layer 4 of the second film is contiguous, the two elementary capacitors are automatically connected in series. The capacitor can be contact-connected at the edge strengthenings of the first film.

For the sake of simplicity, in the example depicted, the capacitor only comprises two elementary capacitors, i.e. the conductor layer 4 of the first film is subdivided into only two sectors, while the conductor layer 4 of the second film only comprises a single sector 4.3. It is often the case, however, that the conductor layers of both films have a plurality of sectors separated by gaps running along the longitudinal direction. The sectors of the first and second conductor layers are then offset with respect to one another. Elementary capacitors are formed in each case between one half of one sector and the other half of an opposite sector. By connecting the sector halves, the capacitors are connected in series in pairs, so that it is possible to effect a series circuit of as many elementary capacitors as desired. The main current paths run in the interior, preferably in the vicinity of the center, of the sectors. Only the sectors arranged right at the edge are provided, analogously to the sectors 4.1 and 4.2 of the depicted first film 1, with main current paths which run at the longitudinal edge and simultaneously serve for edge strengthening and can be contact-connected.

The auxiliary current paths 6 of the first and second films are preferably arranged offset with respect to one another, just like the main current paths 5.

The conductor layers 4 of all the films depicted have a reduced conductivity. In concrete terms, this means that their sheet resistance is at least 5Ω, preferably at least 20Ω. By contrast, the current paths 5, 6 have a conductivity that is as large as possible, i.e. for example a sheet resistance of 1Ω or less. If a breakdown occurs, the large resistance restricts the affected region to a small area surrounding the breakdown location, so that there is only little impairment of the capacitance of the capacitor. As a result, the breakdown-governed aging of the capacitor is small. On the other hand, the total sheet resistance as averaged sheet resistance is not high on account of the high conductivity of the current paths, as a result of which the losses in normal operation are kept low.

Figure 6:
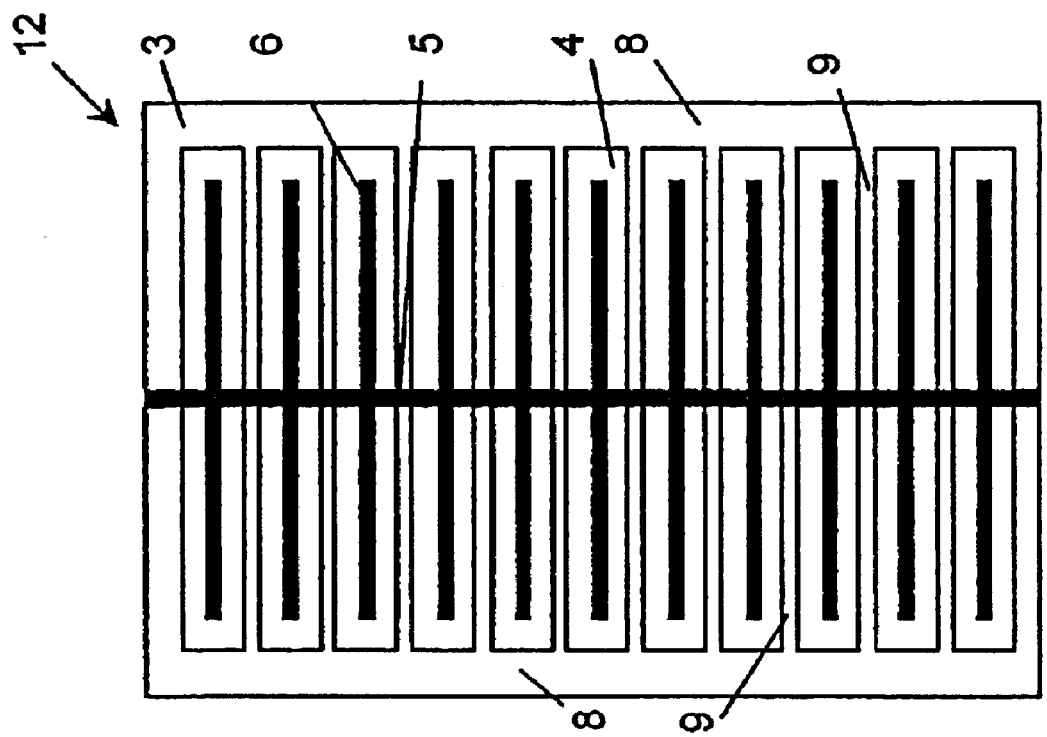
FIGS. 5 and 6 show a plan view—not to scale—of a first and a second film of a further embodiment of the capacitor according to the invention.
Figure 5:
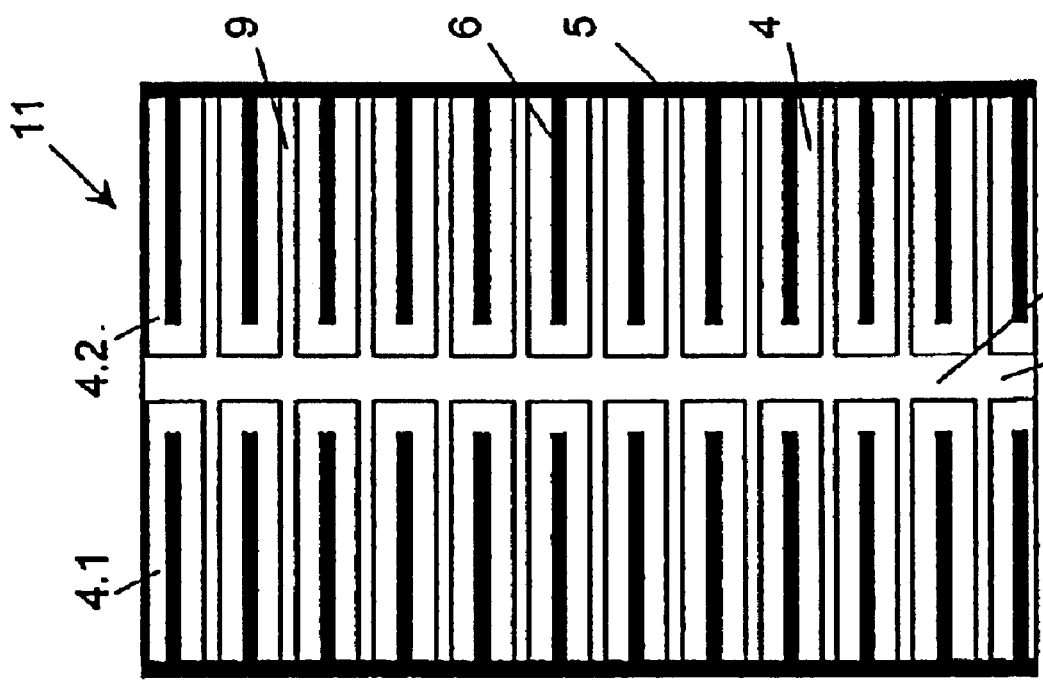

FIGS. 5 and 6 depict a first film 11 and a second film 12 whose function and construction largely correspond to those of the films 1, 2 of FIGS. 1 to 4. However, the conductor layer sectors 4.1, 4.2 of the conductor layer 4 of the first film and the conductor layer 4—forming a single sector—of the second film are segmented. They have trench-like cutouts 9 at regular intervals, where the carrier film is essentially free of a conductive coating. In the example depicted, the cutouts 9 run parallel to the auxiliary current paths 6 and in the center between two adjacent auxiliary current paths, i.e. the auxiliary current paths 6 run approximately in the center of the segments.

The segmentation has the effect of additionally reducing the breakdown-governed capacitance losses. This is because the area affected during the breakdown is additionally limited by the edges of the segments.

Segmentation is useful particularly when the sheet resistance of the conductor layers is chosen to be comparatively low, for example in the range between 5Ω and 70 Ω.

It shall also be mentioned that the invention is not, of course, restricted to the exemplary embodiments explained. In particular, the materials of the carrier film, of the conductor layer and of the current paths can be varied as desired within the scope of customary expert action. The thickness of the carrier film and of the conductor layer can also be varied and adapted to the requirements of a specific capacitor construction. The form of the film can be chosen as desired. The current paths can be essentially homogeneous or, as an alternative thereto, be formed with a gradient in the resistance. The main current paths can have a sheet resistance that differs from the sheet resistance of the auxiliary current paths, for example by means of a different cross-sectional area. However, they may also have the same sheet resistance as said paths.

The capacitor may comprise two elementary capacitors that are internally connected in series, or a multiplicity of such capacitors. The internal series circuit may be effected as in the examples described, by means of the offset arrangement of sectors which each form electrodes of two elementary capacitors. Thus, except for sectors arranged at the edge, in this arrangement all the sectors participate in the formation of two elementary capacitors. As an alternative to this, sectors of the conductor layer that are opposite one another in pairs and essentially correspond in terms of their area can also form a respective elementary capacitor, two sectors of adjacent elementary capacitors then being directly electrically connected by a connecting conductor for the purpose of forming the series circuit. A current path preferably runs in the connecting conductor.

The capacitor may comprise a plurality of partial capacitances connected in parallel and/or in series, all the partial capacitances or at least some of the partial capacitances being wound from two films, for example, and being embodied in accordance with the above description It is possible, for example, for a plurality of partial capacitances comprising two films with conductor layers and mutually offset sectors to be arranged next to one another in such a way that the edge strengthenings (in accordance with FIGS. 1 and 5) of adjacent partial capacitances are directly electrically connected to one another—if appropriate with the aid of contact means—and the partial capacitances are interconnected in a series in this way.

The dielectric carrier film 3 preferably comprises plastic, for example polypropylene, PET, polyester, polystyrene, polycarbonate, PEN or paper.

What is claimed is:

1. A film capacitor having at least one carrier film as a dielectric and having a first conductor layer applied thereon and divided into sectors, wherein the sectors and a second conductor are mutually arranged in such a way that an internal series circuit of at least two elementary capacitors is formed, wherein a current path structure having at least one main current path and auxiliary current paths branching therefrom is formed on the sectors, wherein the conductor layers have a high sheet resistance, and wherein the current paths of the current path structure have a lower sheet resistance than the conductor layers.

2. The film capacitor as claimed in claim 1, wherein the sectors run in strip form, and wherein the main current paths run along the sector longitudinal axis.

3. The film capacitor as claimed in claim 1, wherein a sheet resistance of the conductor layer and/or of the auxiliary current paths depends on the distance from a nearest main current path.

4. The film capacitor as claimed in claim 1, wherein at least one of the sectors at least partly comprises segments that are separated by non-conducting cutouts and are electrically connected to one another.

5. The film capacitor as claimed in claim 4, wherein current paths of the current path structure connect the segments.

6. The film capacitor as claimed in claim 5, wherein the segments are connected by main current paths, and wherein auxiliary current paths run within the segments.

7. The film capacitor as claimed in claim 1, wherein the surface resistance of the at least one conductor layer is at least 5 Ω.

8. The film capacitor as claimed in claim 1, wherein the current paths have on average a sheet resistance which is at least 10 times lower than that of the conductor layer.

9. The film capacitor as claimed in claim 1, wherein the current path structure is formed by local thickened portions of the conductor layer.

10. The film capacitor as claimed in claim 1, wherein the current path structure is formed by metal strips made of a metal that is different from the material of the conductor layer being applied at the locations of the current paths.

11. The film capacitor as claimed in claim 1, wherein the capacitor is wound either from the at least one carrier film and a further carrier film each coated on one side or from the at least one carrier film coated on both sides and one uncoated carrier film, a sequence of layers which alternately comprises a carrier film as a dielectric and a conductor layer serving as electrode resulting in cross section.

12. The film capacitor as claimed in claim 11, wherein the current paths of two adjacent layers are arranged offset with respect to one another.

13. A film for a film capacitor having a dielectric carrier film and having a first conductor layer applied thereon and divided into sectors that are directly electrically isolated from one another, the sectors being formed for use as electrodes of series-connected elementary capacitors, wherein a current path structure having at least one main current path and auxiliary current paths branching therefrom is formed on the sectors, wherein the first conductor layer has a high sheet resistance, and wherein the current paths of the current path structure have a lower sheet resistance than the first conductor layer.

* * * * *